United States Patent [19]

Amlani

[11] Patent Number: 4,573,362
[45] Date of Patent: Mar. 4, 1986

[54] MULTI-AXIS LOAD TRANSDUCER

[75] Inventor: Kishan D. Amlani, Troy, Mich.

[73] Assignee: Eaton Corporation, Cleveland, Ohio

[21] Appl. No.: 629,299

[22] Filed: Jul. 9, 1984

[51] Int. Cl.[4] ............................ G01L 5/16; G01L 1/22
[52] U.S. Cl. ................................ 73/862.04; 73/862.67
[58] Field of Search ............ 73/862.04, 862.05, 862.06, 73/862.65, 862.67

[56] References Cited

U.S. PATENT DOCUMENTS

| 3,427,875 | 2/1969 | Saxl | 73/862.04 |
|---|---|---|---|
| 3,867,838 | 2/1975 | Gerresheim | 73/862.04 |
| 3,879,995 | 4/1975 | Libertiny | 73/862.04 |
| 3,939,704 | 2/1976 | Zipin . | |
| 4,092,854 | 6/1978 | Henry et al. . | |
| 4,099,409 | 7/1978 | Edmond . | |
| 4,138,884 | 2/1979 | Ruoff, Jr. . | |
| 4,178,799 | 12/1979 | Schmieder et al. | 73/862.04 |
| 4,319,766 | 3/1982 | Corteg et al. | 73/862.04 X |

FOREIGN PATENT DOCUMENTS

1358231  3/1964  France ................................ 73/862.65

Primary Examiner—Charles A. Ruehl
Attorney, Agent, or Firm—C. H. Grace; A. E. Chrow

[57] ABSTRACT

A strain gage type load sensor having a central disc with a plurality of radially outwardly extending spokes each having the ends thereof flexurally attached to an outer annular reaction portion by means of a pair of oppositely directed beams extending from the spokes at right angles thereto for flexually suspending the central disc from the annular portion. A plurality of upstanding posts supporting a common block. The beams and posts are strain gaged for sensing bending loads. In another embodiment, two central discs are stacked axially with each suspended by connection of the spokes to the annular reaction portion. A first group of strain gages is disposed at mid-radius of the spokes for sensing radial tension and compression strains in the spokes. A second group strain gages is disposed at the inner and outer spoke ends for sensing bending strains in the spokes.

6 Claims, 13 Drawing Figures

MULTI-AXIS LOAD TRANSDUCER

The present invention relates to electrical mode sensing devices for providing an electrical signal indicative of multi-directional loads applied to a moveable connection in a mechanism. In particular, the invention relates to an electrical device for sensing multi-axis loading of the wrist joint in a robotic arm welding machine. In such machines, it is necessary to apply pressure to the area to be welded by the electrode prior to initiation of the flow of weld current. The robot arm mechanism usually applies such electrode pressure by means of pneumatic or hydraulic power cylinders connected to the robot arm linkages. Overload sensors or "clutches" are interposed in the electrical motor actuated drives for moving the robot arm linkages. When the force in the arm exceeds a predetermined level, the movement actuators disengage. However, it has been found that where the rate of force increase or buildup is rapid, that often the clutching mechanism cannot respond in sufficient time to prevent overloading of the robot arm linkage and resultant damage to the robotic arm.

This problem is usually encountered in the multi-axis movement drive mechanisms employed in positioning the arm of the robotic welder where the electrodes become "frozen" in contact with the weldment, and the arm actuators attempt to move the arm including the "wrist" joint to another welding station.

It has therefore been desired to find a technique for limiting the force applied by the actuator mechanisms to a robotic arm and to provide for rapid response to sudden increases in loads applied along any of several axes. It has been particulary desired to provide a means of sensing the load buildup in a robotic arm "wrist" joint to enable stopping of the arm actuation mechanism before damage occurs to the arm.

In a known robotic welder application, the overload clutching mechanism comprises a preloaded spring in the "wrist" joint which is effective, upon load buildup to a level in excess of the preload, to cause movement of an electrical switch member for breaking a set of contacts to disable the arm actuator mechanism from causing further movement. In such a known robotic welder arm installation, where load buildup occurs rapidly, the time required for the switch movement to create an open circuit is prohibitive and prevents disablement of the actuator in time to prevent overload and damage to the robotic arm.

Furthermore, in such known robotic welder applications, it is necessary to dismantle the preload spring mechanism and change the spring in order to provide major changes in the preload limit setting. The time required and the inconvenience of changing the preload spring assembly setting, has rendered such techniques prohibitively costly for high volume, high speed production applications of the robotic welder such as those encountered in automotive assembly line welding.

It has thus long been desired to find a way or means of providing an electrical transducer for continuously sensing and indicating the loads applied to the linkages and pivoted joints of a mechanism, as for example, the arm of a robotic spot welder. It has been desired to provide a multi-axis load transducer for continuously sensing loads such that the electrical signal could provide advance warning of applied loads before reaching a predetermined limit level. In particular, it has long been desired to provide a multi-axis transducer mountable in the "wrist" joint of a robotic arm for providing continuous readout of the loads applied to the robotic arm.

SUMMARY OF THE INVENTION

The present invention relates to force or load sensing transducers providing an electrical signal continuously indicating the level of the force and having the capability of sensing loads applied along multi-directional axes. The invention relates to sensors capable of providing an electrical signal indicative of axial and lateral thrust; axial "tilt" or moment loads about axes lying in the lateral plane and axial moment loads. The present invention comprises a force or load transducer of the type employing strain gages bonded to the surfaces of distinct sensing portions of a unitary load sensing member. Flexing of the various distinct portions of the member is sensed by appropriately placed groups of strain gages which provide an imbalance to Wheatstone bridge circuit for providing a voltage signal indicative of the strain sensed by the particular group of strain gages.

The bridge output voltage signals can be used to determine the rate of rise of the strain. Sensing the rate of rise of strain, the load enables disablement of the movement actuator before an overload condition is encountered.

The present invention employs a transducer having a central disc portion with radially outwardly extending spokes, each of which is joined to a common outer annular rim portion by means of reduced-section flexing portions. In one embodiment, the spokes themselves are strain gaged to indicate flexural strains therein and with a pair of discs stacked axially, each disc having outwardly extending radial spokes to thus provide averaging of the strain imposed by flexing in any of the given directions of tilt or axial or lateral thrust.

In another embodiment, employing a single central disc portion, the spokes are attached to the outer annular rim by means of thin flexural webs extending in opposite directions and generally at right angles to the outer end of the spokes. Strain gages are applied to the flexural webs for sensing bending strains and thus axial thrust and "tilt" about axes lying in the plane of the annual rim. A plurality of upstanding posts are provided extending axially from the central disc portion and join a common force input member. Each of the posts is strain gaged for measuring bending strains therein thereof. The strain gages on the upstanding axially extending posts thus sense lateral thrusts parallel to the plane of the annular rim and moment loads about an axis normal to the plane of the rim.

The present invention thus provides a novel multi-axis force transducer which employs a central disc portion from an outer annular rim by outwardly extending portions of reduced cross section strain gaged for bending strains. A plurality of axial or upstanding posts of reduced cross section interconnect the central disc portion with a common load input block and strain gages are applied to the posts to sense bending caused by lateral thrust or axial torque supplied to the load input block.

DETAILED DESCRIPTION

Figure 1:
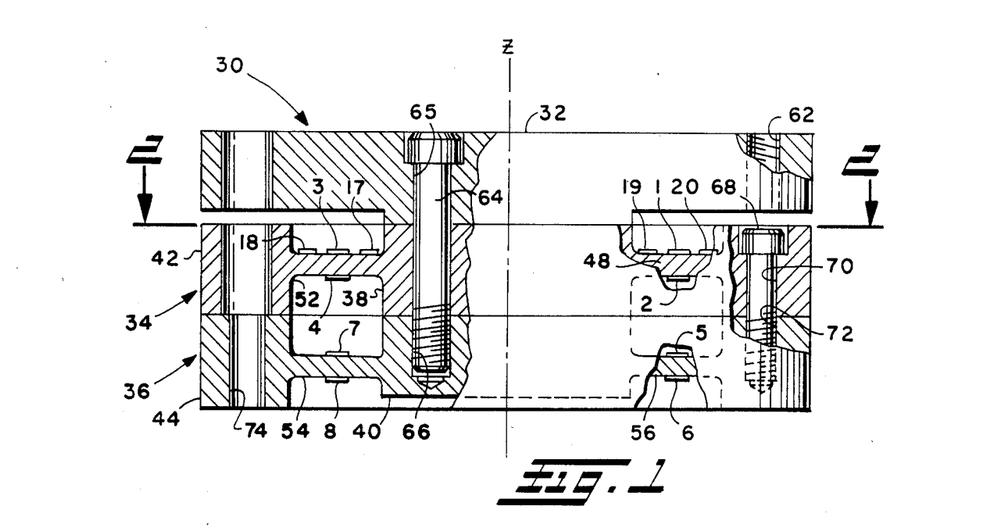
FIG. 1 is a side view in elevation of the transducer of the present invention employing plural axially stacked disc portions.

Referring now to FIG. 1, the transducer indicated generally at 30 is shown in one embodiment as having a force receiving or input member in the form of plate 32. The force transmitting members comprise stacked plates indicated generally at 34, 36 each having respectively central disc portions 38, 40 disposed within force transmitting or reaction portions in the form of annular outer rims 42, 44.

Figure 2:
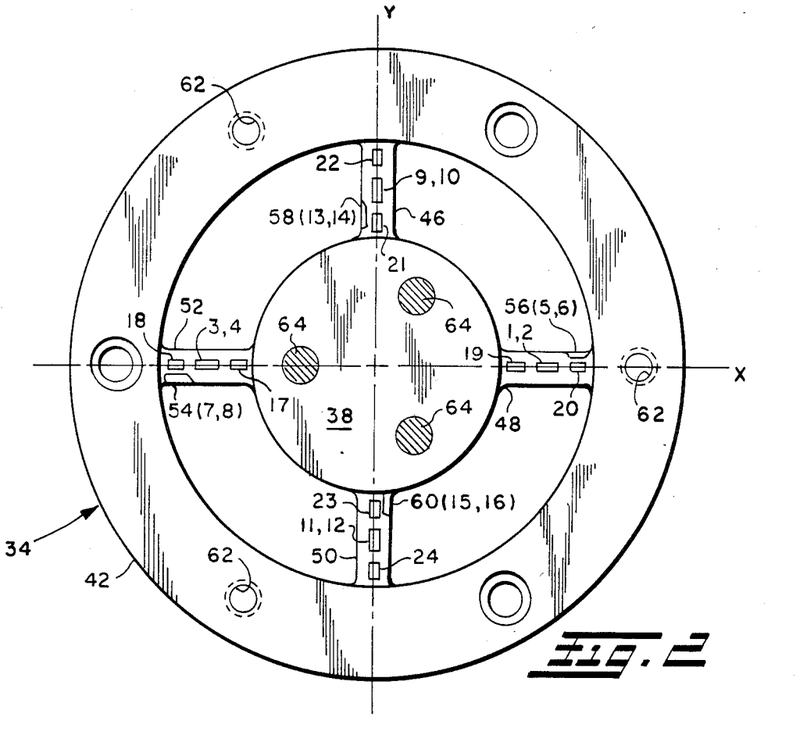
FIG. 2 is a view taken along section indicating lines 2—2 of FIG. 1.

Referring now to FIG. 2, the upper plate 34 is illustrated as typical of both plates, and has a plurality of spokes 46, 48, 50 and 52 disposed in circumferentially equally spaced arrangement and extending radially outwardly from the central disc 38 and joining the inner periphery of the rim 42. The spokes 46, 48, 50 and 52 are formed of reduced thickness with respect to their width in the plane of the plate 34, 36. The lower plate 36 also has four similar spokes, 54 56, 58 and 60 portions of which are visible in FIG. 1 through the broken-away segments of the spokes of the upper plate 34.

The transducer 30 is attached to a force input device (not shown) by fasteners received in threaded engagement with tapped holes 62 provided in the outer peripheral region of the upper face of plate 32.

The plates 32, 34, 36 are fastened together and retained by bolts 64 received through apertures 65 formed in plate 32 and the central disc portion 38 of plate 34 and threadedly engaged in tapped holes 66 provided in the central disc portion 40 of the lower plate 36. Thus, loads applied to the upper plate 32 are transmitted to the central disc portion 38, 40 of the plates 34, 36.

The outer reaction, or force transmitting, rim portions 42, 44 of the plates 34, 36 are fastened together by bolts 68 received through clearance holes 70, in the upper rim 42 and threadedly engaging tapped holes 72 provided in the lower plate rim 44 for clamping the rims together. The clamped together rims 42, 44 are attached to the desired reaction member of the device or robot arm (not shown) by bolts (not shown) received through clearance holes 74 provided in the rim 44 of the lower plate 36. It will be understood that forces applied to the inner disc portions 38, 40 are transmitted via the spokes 46 through 52 to rim 42 and through spokes 54 through 60 to the rim 44.

Referring to FIGS. 1 and 2, each of the spokes 46 through 52 has strain gages mounted on the upper and lower surfaces thereof, with the gages numbered 1 and 2 located, respectively, at mid-radius on the upper and lower surfaces of spoke 48, gages numbered 3 and 4 are located, respectively, at mid-radius on the upper and lower surfaces of spoke 52; gages numbered 9 and 10, respectively, are located at mid-radius on the upper and lower surfaces of spoke 46 and gages numbered 11 and 12 located, respectively, at mid-radius on the upper and lower surfaces of spoke 50.

Strain gages are also disposed on the upper and lower surfaces of each of the spokes 54 through 60 of the lower plate 36. Strain gages numbered 5, 6 are located, respectively, at mid-radius on the upper and lower surface of spoke 56; strain gages 7 and 8 are located, respectively, at mid-radius on the upper and lower surfaces of spoke 54. Strain gages 13, 14 are located, respectively, at mid-radius on upper and lower surfaces of spoke 58; and, strain gages 15, 16 are disposed, respectively, at mid-radius on the upper and lower surfaces of spoke 60. Each of the strain gages is oriented on a spoke so as to sense tension or compression strains in the longitudinal or radial direction of the spoke.

An additional set of strain gages is disposed on the upper surface only of the upper plate spokes 46 through 52 in pairs on each spoke with one strain gaged mounted at each end of each spoke as shown in FIGS. 1 and 2. Spoke 46 has gage 21 mounted on the radially inner end thereof and gage 22 mounted on the radially outer end thereof. Spoke 48 has gage 19 disposed on the inner end of the upper surface thereof and gage 20 disposed on the radially outer end thereof on the upper surface.

Spoke 50 has a gage 23 disposed on the inner end thereof and gage 24 disposed on the outer end thereof with both gages on the upper surface of the spoke. Spoke 52 has gage 17 mounted on the upper surface at the radially inner end thereof and gage 18 mounted on the upper surface at the radially outer end thereof. Gages 17 through 24 are oriented to sense tension and compressive bending strains in the longitudinal or radial direction of the spoke.

Figure 3:
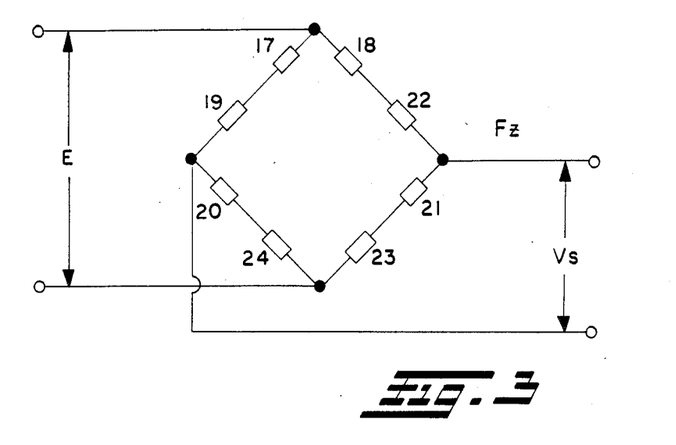
FIG. 3 is a Wheatstone bridge circuit for strain gages sensing loads in the direction of the Z axis for the transducer of FIG. 1.

Referring now to FIG. 3, the Wheatstone bridge circuit schematic for the strain gages of the embodiment of FIGS. 1 and 2 is shown for sensing thrust loads applied to the plate 32 along the direction of the Z axis. The bridge of FIG. 3 employs the gages for the plate 34 located at the inner and outer ends of each spoke on the upper surface thereof connected in series in one arm of the bridge. Thus, for a load directed downwardly along the Z axis in FIG. 1, the central disc portion 38 is deflected downwardly with respect to the rim 42 placing the radially inner gages 17, 19, 21 and 23, in compression; whereas the radially outwardly disposed gages 18, 20, 22 and 24, sense tensile strains due to bending of each of the spokes. The series connection of the strain gages for each of the spokes in a common arm of the bridge thus averages the effects of the tension and compression bending strain in each spoke.

Figure 4:
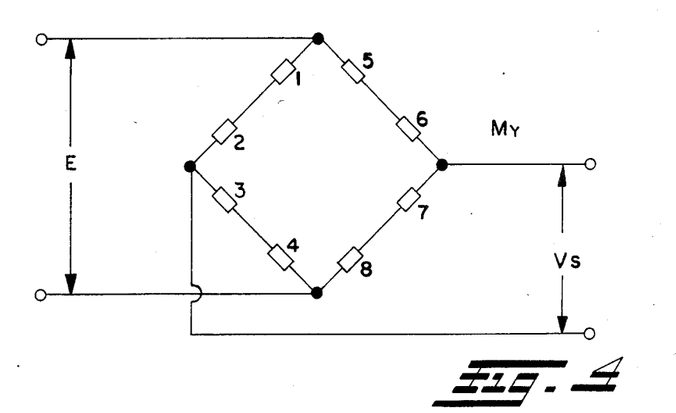
FIG. 4 is a Wheatstone bridge circuit for strain gages sensing tilt about the Y axis of the embodiment of FIG. 2.

Referring now to FIG. 4, the Wheatstone bridge circuit is shown for the embodiment of FIGS. 1 and 2 wherein the strain gages located, respectively, on the upper and lower surfaces of the central region or mid-radius of each spoke are connected in series in a common arm of the bridge. The gages of diametrically opposed spokes of the upper and lower plates 34, 36 are arranged in opposite legs of the bridge. Such an arrangement permits the gages to sense "tilt" of the central disc portion 38, 40 with respect to the annular rims 42, 44 about an axis lying in the plane of the plates 34, 36 or normal to the Z axis.

In particular, gages 1, 2, which are disposed on the upper and lower surfaces of spoke 48 in the upper plate 34, are connected in series in a bridge arm arranged opposite the bridge arm having gages 7 and 8 therein, for the diametrically opposite spoke 54 of the lower plate 36. Similarly, gages 3 and 4 disposed on the upper and lower surfaces of spoke 52 of upper plate 34 are disposed in a series connected arrangement in an arm of the bridge opposite the arm containing series connected gages 5 and 6 disposed on the diametrically opposed spoke 56 of the lower plate 36. Thus, for applied loads in the form of moments tending to rotate the central disc portions about the Y axis, the gages on opposites sides of the bridge will be commonly in tension or compression depending upon the sense of the moment about the Y axis.

It will be readily understood that "tilt" of the central disc portions about the Y axis places the spokes 52, 54 and 48, 56 radially in either compression or tension.

Figure 5:
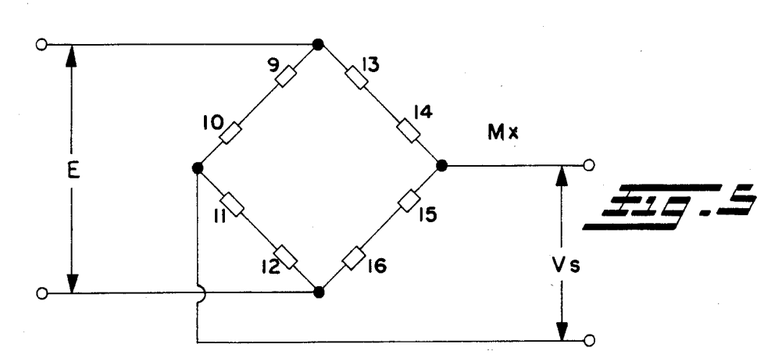
FIG. 5 is a Wheatstone bridge circuit for the strain gages employed for sensing tilt about the X axis of the embodiment of FIG. 2.

Referring now to FIG. 5, the Wheatstone bridge circuit is shown for the embodiment of FIGS. 1 and 2 wherein the gages disposed, respectively, on the upper and lower surfaces of spokes 50, 60 and 46, 58 are connected in series in a common arm of the bridge, with the gages for diametrically opposed spokes of alternately the upper and lower plates 34, 36 are series connected on the opposite sides of the bridge. Specifically, mid-radius gages 9, 10, respectively, on the upper and lower surfaces of spoke 46 are wired in an arm of the bridge oppositely disposed from mid-radius gages 15, 16 disposed on the lower spoke 60. Gages 13, 14 disposed on, respectively, the mid-radius of the upper and lower surfaces of lower spoke 58 are arranged in an arm of the bridge opposite the mid-radius gages 11, 12, respectively, on the upper and lower surfaces of spoke 50.

Thus, an applied load in the form of a moment tending to tilt the disc portions 38, 40 which respect to the rims 42, 44 about the X axis will thus place the gages on opposite sides of the bridge commonly in tension or compression. The series connection of the gages, respectively, on the upper and lower surface of each spoke will thus average the strains in a particular spoke on the upper and lower surfaces thereof.

Figure 6:
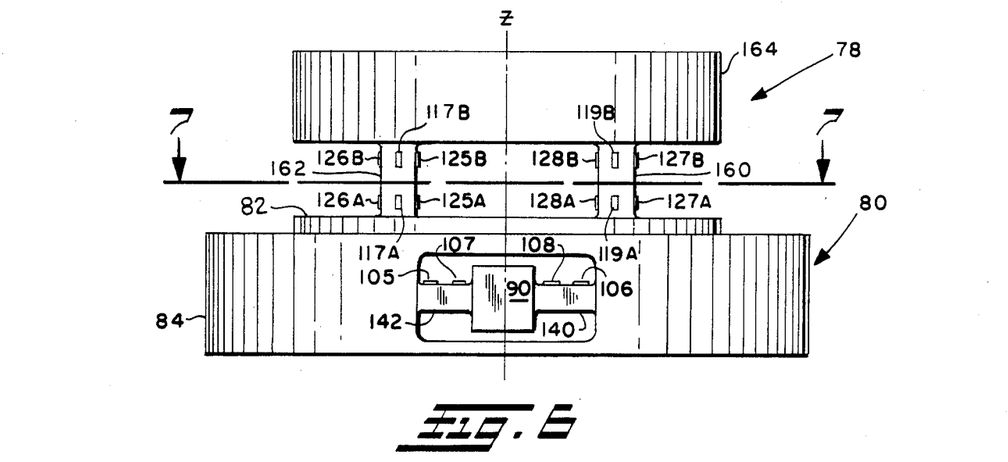
FIG. 6 is a transducer of the present invention embodying a single central disc portion and a common load input block supported by posts extending axially from the central disc portion.
Figure 7:
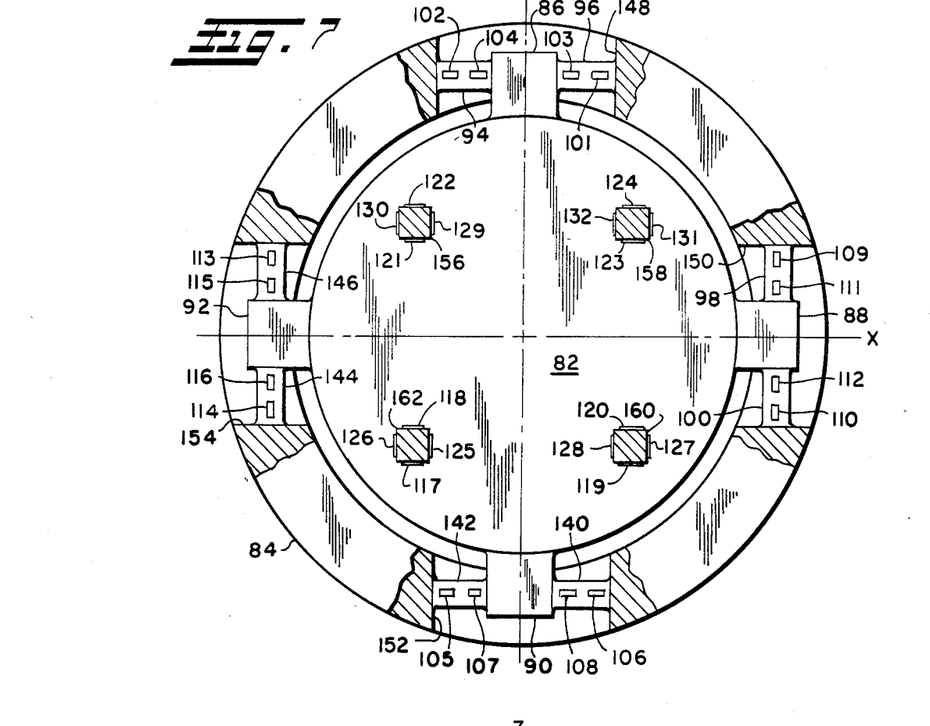
FIG. 7 is a view taken along section indicating line 7—7 of FIG. 6.

Referring now to FIGS. 6 and 7, another embodiment of the invention transducer is shown generally at 78 having a plate member indicated generally at 80 with a central disc portion 82 and an outer annular rim portion 84. The central disc portion 82 is suspended from the rim 84 by a plurality of radially outwardly extending spokes 86, 88, 90 and 92. Each of the spokes 86 through 92 has a plurality of elongated webs extending therefrom at generally right angles thereto in opposite directions as denoted by webs 94, 96 extending from spoke 86, webs 98, 100 extending from spoke 88, webs 140, 142 extending from spoke 90 and webs 144, 146 extending from spoke 92.

Each of the webs 94 through 100 and 140 through 146 has the outer end thereof joined to the wall of an aperture formed in the rim 84. Specifically, webs 94, 96 are joined to the wall of aperture 148 having the Y axis passing therethrough webs 98, 100 are joined to the wall of aperture 150 having the X axis passing therethrough. Webs 140, 142 are joined to the wall 152 of an aperture disposed on the Y axis opposite aperture 148; and, webs 144, 146 are joined to the wall 154 of an aperture having the X axis passing therethrough and disposed opposite aperture 150.

Each of the elongated webs 94 through 100, 140 through 146 are formed thin with respect to their widths to permit flexing thereof upon application of loading to the transducer. It will be understood that the central disc portion 82 is thus flexurally suspended from the outer rim 84 by the webs 94 through 100, 140 through 144.

The central disc portion 82 of member 80 has attached thereto a plurality of upstanding posts 156, 158, 160 and 162 equally spaced from the center of central disc portion 82 with the upper end of each post joined to common load input flange portion 164, which is adapted for receiving input loads to the transducer. In the presently preferred practice, the posts 156 through 162 have a square configuration in transverse section, as shown in the sectional view of FIG. 7; and, the posts are generally small in transverse dimension with respect to their length.

Referring to FIGS. 6 and 7, each of the posts has a pair of strain gages mounted on each face thereof with one gage adjacent the lower end of the post; and, the second gage of the pair located adjacent the upper end of the post. As shown in FIG. 6, the gages in each pair are denoted as having the suffix "A" for the lower gage and the suffix "B" for the upper gage of each pair.

It will be understood that in the circuit schematic of FIGS. 3 through 5 and 8 through 13 that the bridge excitation voltage is denoted by the letter "E" and the bridge output voltage signal denoted by $V_s$.

Figure 8:
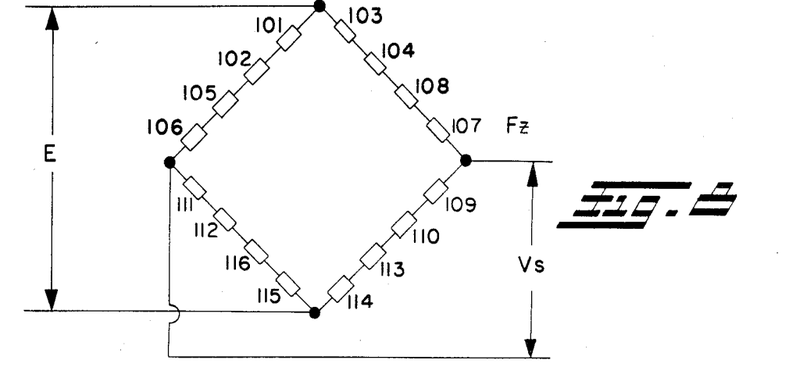
FIG. 8 is a Wheatstone bridge circuit for strain gages employed in the embodiment of FIG. 6 for sensing thrust loads applied in the direction of the Z axis.

Referring now to FIG. 8, a Wheatstone bridge circuit is shown schematically in which the strain gages mounted on the webs 94 through 100 and 140 through 146 are series connected in groups of four in one arm of the bridge circuit for sensing loads applied in the direction of the Z axis. In the circuit of FIG. 8, the outboard web gages 101, 102 for spoke 86 are series connected with the outboard web gages 105, 106 for spoke 90. Gages 101, 102 and 105, 106 will all be in either tension or compression depending upon the sense of the load applied the Z axis.

Similarly, the outboard web gages 109, 110 for spoke 88 and web gages 113, 114 for spoke 92 are series connected in a common bridge arm disposed opposite the arm for the outboard gages for spokes 86, 90. The inboard web gages 103, 104 for spoke 86 and web gages 108, 107 for diametrically opposite spoke 90 are series connected in a common bridge arm as are inboard web gages 111, 112 for spoke 88 and inboard web gages 115, 116 for spoke 92 which are arranged in a bridge arm opposite the inboard gages for spokes 86, 90. It will be understood that the inboard web gages will measure bending strain of an opposite sense from the outboard gage for a given web.

Figure 9:
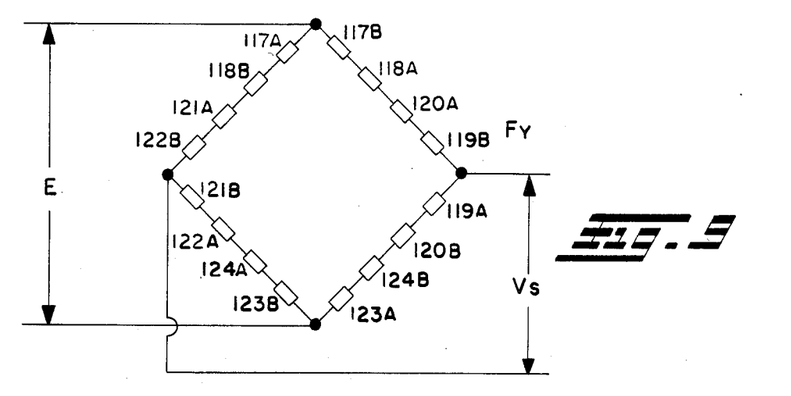
FIG. 9 is a Wheatstone bridge circuit for strain gages employed, in the embodiment of FIG. 6 for sensing lateral thrust loads applied along the direction of the Y axis.

Referring now to FIG. 9, the Wheatstone bridge circuit is shown for sensing laterally or transversely applied load in the direction of the Y axis. The strain gages for the circuit of FIG. 9 comprise pairs of gages disposed on the faces of the upstanding posts 156 through 162, which extend transversely to the Y axis. These gages thus are subjected to tensile and compressive bending strains by movement of the block portion 164 with respect to the central disc portion 82 under the application of load in the direction of the Y axis. In particular, gages on opposite sides of a particular post which would be in a common strain state, are connected in series in a common bridge arm for the pair of posts on a common side of the Y axis. For example, gages 117A at the lower end of post 162 and the gage 118B at the upper end of the opposite side of post 162 along with gage 121A at the lower end of post 156 and the gage 122B at the upper end of the opposite face of post 156, all are connected in a common bridge arm. Similarly, the correspondingly disposed gages for posts 158, 160 are connected in a common bridge arm opposite the arm for posts 156, 162. Thus, gages 119A and 120B for posts 160 are series connected in a common bridge arm with gages 124B and 123A of post 158.

The remaining pairs of gages on the transverse faces of the posts with respect to the Y axis, are connected correspondingly in opposite bridge arms with the gages for the posts on a common side of the Y axis all series connected in one bridge arm and the gages for the posts on the opposite side of the Y axis series connected in the opposite bridge arm. Thus, gages 117B and 118A of post 162 are series connected in a bridge arm along with gages 120A and 119B for placing the gages of posts on opposite sides of the Y axis in a common bridge arm. Correspondingly, gages 121B and 122A of post 156 are series connected in a bridge arm along with gages 124A and 125B.

Figure 10:
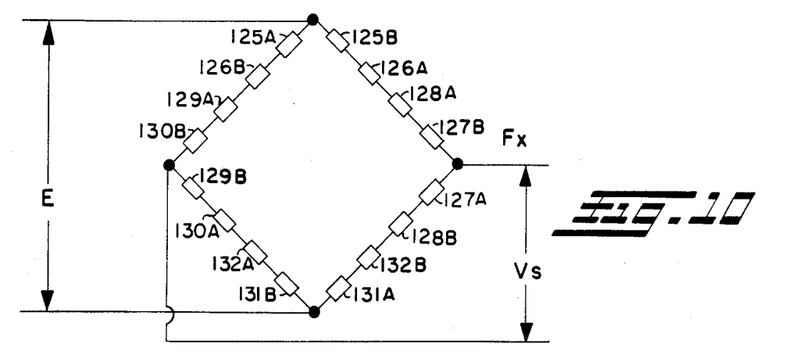
FIG. 10 is a Wheatstone bridge circuit for the strain gages employed in an embodiment of FIG. 6 for sensing lateral thrust loads applied in the direction of the X axis.

Referring now to FIG. 10, a Wheatstone bridge circuit is shown for connecting the gages of the faces of the upstanding posts 156 through 162, which are disposed transversely to the X axis for sensing tensile and compressive stresses due to bending of the post when the upper block portion 164 is subjected to lateral or transverse loads in a direction of the X axis. Specifically, the gages for posts 156, 162 are series connected in one bridge arm opposite the series connection of the gages for posts 158, 160; and, the gages for posts 160, 162 are series connected in one bridge arm disposed oppositely the gages for posts 156, 158 which are also series connected in a common bridge arm. In particular, gages 125A, 126B from posts 162 are series connected in a common bridge arm with gages 129A, 130B from posts 156. Gages 127A, 128B from post 160 are series connected in a common bridge arm with gages 132B, 131A of post 158.

Gages 125B, 126A of post 162 are series connected in a common bridge arm and in series with gages 128A, 127B of post 160. In a correspondingly oppositely disposed bridge arm gages 129B, 130A of post 156 are series connected and in series with gages 132A, 131B of post 158 for averaging the effects of tilt about the X axis. The gages on the upstanding post when connected in the individual Wheatstone bridge circuits of FIGS. 9 and 10, thus provide a transducer having a high degree of sensitivity by virtue of measuring bending strain in the post for loads applied laterally or in the direction at right angles to the posts 156 through 162.

Figure 11:
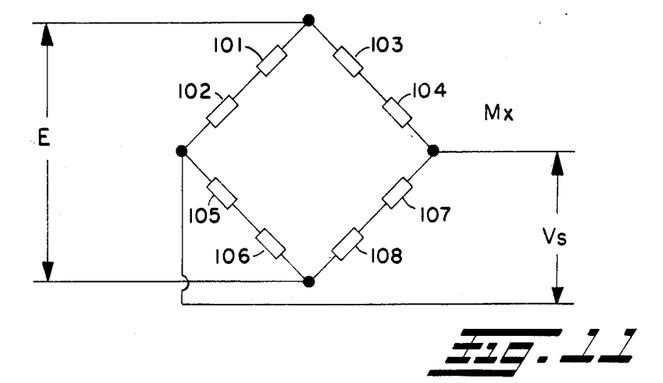
FIG. 11 is a Wheatstone bridge circuit for the strain gages employed in the embodiment of FIG. 6 for sensing moments loads applied about the X axis.

Referring now to FIG. 11, a Wheatstone bridge circuit is shown for connecting the gages applied to the webs for sensing loads applied in a direction to produce "tilt" in the form of a moment about the X axis. In particular, outboard gages 101, 102 of webs 96, 94 associated with spoke 86 are series connected in a bridge arm oppositely disposed to series connected inboard web gages 107, 108 associated with the webs 140, 142 on diametrically opposite spoke 90. It will be understood that the outboard gages sense bending strains on one spoke 86 as do the inboard gages in a diametrically opposite spoke 90 for torque supplied about the X axis. The remaining arms of the bridge of the circuit of FIG. 11 contain series connected inboard gages 103, 104 of webs 96, 94 associated with spoke 86; and, in an opposite arm of the bridge, are series connected outboard web gages 105, 106 associated with diametrically opposite spoke 90 to average the effects of like-sense bending strain in webs of the spoke disposed diametrically for averaging the bending strain effect on opposite sides of the X axis when the transducer is subjected to moment loading about the X axis.

Figure 12:
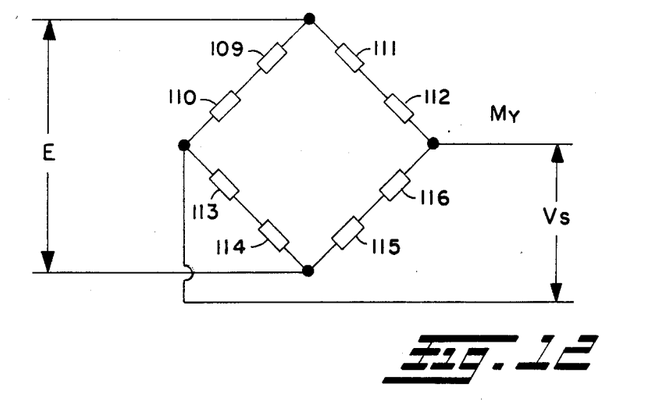
FIG. 12 is a Wheatstone bridge circuit for the strain gages employed in the embodiment of FIG. 6 for sensing load moments applied about the Y axis; and, FIG. 13 is a Wheatstone bridge circuit for the strain gages employed in the embodiment of FIG. 6 for sensing load moments applied about the Z axis.

Referring now to FIG. 12, a Wheatstone bridge circuit is shown for gages measuring bending strains in the spoke suspending webs when the transducer input block portion 164 is subjected to loads producing a moment about the Y axis. In particular, outboard gages 109, 110 on webs 98, 100 associated with the spoke 88 are series connected in one bridge arm; and, inboard gages 115, 116 for webs 144, 146 associated with diametrically opposite spoke 92 are series connected in the opposite bridge arm for sensing the bending strain in the webs due to torsion of the input block 164 and central disc portion 82 about the Y axis. The remaining arms of the bridge circuit of FIG. 12 contain inboard gages 111, 112 for webs 98, 100 associated with spoke 88 on one of the remaining bridge arms; and, outboard gages 113, 114 on webs 114, 146 associated with spoke 92 are series connected in the remaining opposite bridge arm. Thus, the entire bridge circuit of FIG. 12 averages the effects of bending strain in the webs 98, 100 and 144, 146 in response to torque loading about the Y axis.

Figure 13:
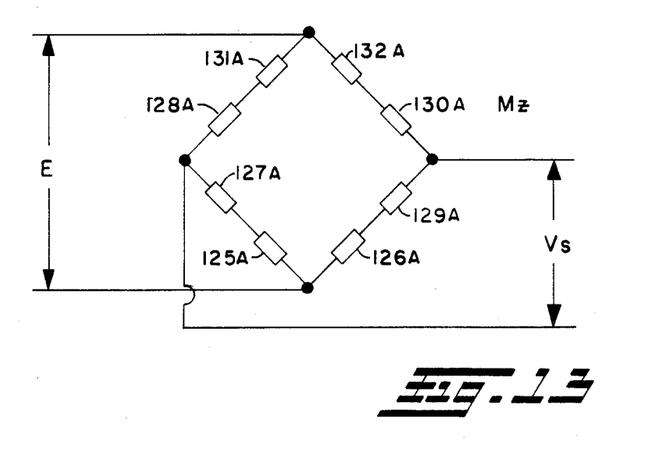

Referring now to FIG. 13, a Wheatstone bridge circuit is shown for gages sensing the effect of strain due to loads applied to input block portion 164 tending to produce a torque or torsion about the Z axis. The bridge circuit of FIG. 13 employs strain gages on the upstanding posts 156 through 162 as will now be described. One arm of the bridge of FIG. 13 has lower post gages 131A, 128A from respectively, posts 158, 160 series connected in one arm with lower post gages 129A, 126A from posts 156, 162 series connected in the opposite arm of the bridge.

The remaining bridge arms have lower post gages 130A, 132A from posts 156, 158 series connected in one arm, with lower post gages 125A, 127A associated with respectively posts 162, 160 series connected in the remaining bridge arm. The bridge circuit of FIG. 13 is thus connected such that the strain due to bending of the posts by the moment loads applied about the Z axis are sensed in the region of the posts 156 through 162 subjected to the maximum bending strain.

Although the bridge circuit of FIG. 13 is illustrated as wired with the lower post gages, it will be understood that a similar bridge circuit may be wired employing the upper post gages bearing the same reference numerals but having a "B" suffix.

The present invention thus provides a novel load transducer for continuously sensing or multi-axis loads and which is particularly suitable for the wrist joint connections in robotic arm welders. The transducer of the present invention employs at least one central disc portion suspended from an outer annular reaction member portion by thin flexural webs or spokes. The flexural webs or spokes are strain gaged to provided indication of the bending strains therein and thus have a high degree of sensitivity to loads applied in transverse directions, or to loads tending to "tilt" the central disc portion with respect to the annular reaction member. The transducer also employs a plurality of upstanding posts from the central disc portion which receive input loads from a common block portion; and, strain gages are applied to each post to measure the bending strains therein caused by transverse and movement loads about the vertical axis.

Although the invention has hereinabove been described with respect to the illustrated embodiments, it will be understood that the invention is capable of modification and variation and is limited only by the following claims.

I claim:

1. A multi-directional load transducer comprising:
   (a) an integrally formed member having,
      (i) an outer annular reaction portion for transmitting force,
      (ii) an inner disc portion disposed within said annular portion, said disc portion having a plurality of radially outwardly extending spokes each having a plurality of elongated generally thin webs extending outwardly therefrom oppositely in a direction normal to the radius of said disc portion, said webs having the outward ends thereof joined with said annular portion such that said inner disc is suspended from said annular portion by said webs,
      (iii) a plurality of upstanding generally elongated posts extended from said disc portion in a direction axially of said annular portion,
      (iv) a common force receiving block member having the outward ends of said posts joined thereto for supporting said block member upon said disc portion;
   (b) first strain gage means disposed on the surfaces of said posts for sensing bending strains in said posts; and
   (c) second strain gage means disposed on the surfaces of said webs for sensing bending strains in said webs.

2. The device defined in claim 1, wherein said spokes and webs are received in apertures formed in said annular portion.

3. The device defined in claim 1, wherein said plurality of said posts comprises four posts equally spaced from the center of said disc portion.

4. The device defined in claim 1, wherein said plurality of spokes comprises four radially extending spokes disposed about said disc portion in equally spaced arrangement.

5. A multi-directional load transducer comprising:
   (a) an annular force transmitting reaction member;
   (b) at least one disc member for receiving input loads, said disc member received centrally within said annular member;
   (c) a first and second plurality of spokes respectively extending radially outwardly from said central disc member and joined to said annular member, each of said spokes having reduced transverse section thickness for rendering said spokes resiliently deflectable in bending, said first plurality of spokes disposed circumferentially equally spaced at a first axial station with respect to said annular member and said second plurality of spokes disposed at the same circumferential locations and at an axial station spaced axially from said first axial stations;
   (d) first strain gage means disposed at generally mid-radius in axially opposite surfaces of each of said spokes for sensing radial compression and tension in each spoke; and
   (e) second strain gage means disposed on opposite sides of said first strain gage means disposed on said first plurality of spokes on the side thereof facing away from said second plurality of spokes, said second strain gage means oriented to sense tension and compression bending strain in each of said spokes of said first plurality.

6. A load transducer for sensing multi-directional loads comprising:
   (a) a central disc member adapted for connection to receive force inputs thereto;
   (b) an outer annular reaction member adapted to transmit said force inputs, said annular member disposed to surround said disc member;
   (c) a plurality of spokes extending radially outwardly from said central disc;
   (d) a pair of elongated resilient webs thin in transverse section extending outwardly and generally at right angles with respect to each of said spokes, said webs each having the end thereof remote from said spoke joined to said reaction member for force transmission thereto, wherein said central disc is suspended from said reaction members by said webs;
   (e) strain gage means disposed on the surface of each said web for sensing tensile and compressive bending strains in the direction of elongation of said webs;
   (f) electrical bridge circuit means operative to average the strains measured by the gage means on each of said webs;
   (g) a plurality of posts upstanding from said central disc member;
   (h) a load block commonly joined to each of said posts for force input thereto; and,
   (i) strain gage means operable to sense bending strains in said posts.

* * * * *